US008484461B2

(12) United States Patent
Metke et al.

(10) Patent No.: US 8,484,461 B2
(45) Date of Patent: Jul. 9, 2013

(54) METHOD AND APPARATUS FOR EXTERNAL ORGANIZATION PATH LENGTH VALIDATION WITHIN A PUBLIC KEY INFRASTRUCTURE (PKI)

(75) Inventors: Anthony R. Metke, Naperville, IL (US); Donald E. Eastlake, III, Milford, MA (US)

(73) Assignee: Motorola Solutions, Inc., Schaumburg, IL (US)

( * ) Notice: Subject to any disclaimer, the term of this patent is extended or adjusted under 35 U.S.C. 154(b) by 852 days.

(21) Appl. No.: 12/241,566

(22) Filed: Sep. 30, 2008

(65) Prior Publication Data

US 2010/0082975 A1    Apr. 1, 2010

(51) Int. Cl.
*H04L 9/30* (2006.01)

(52) U.S. Cl.
USPC ............................................ 713/157; 713/156

(58) Field of Classification Search
USPC .................................................. 713/157, 156
See application file for complete search history.

(56) References Cited

U.S. PATENT DOCUMENTS

| 7,290,133 | B1 | 10/2007 | Montgomery |
| 7,397,771 | B2 * | 7/2008 | Nakasaku et al. ............ 370/254 |
| 2003/0130947 | A1 | 7/2003 | Benantar |
| 2008/0091940 | A1 | 4/2008 | Dean |

FOREIGN PATENT DOCUMENTS

WO    2006067503 A1    6/2006

OTHER PUBLICATIONS

Housley, "Internet X.509 Public KEy Infrastructure Certificate and Certificate Revocation List (CRL) Profile," Apr. 2002.*
Housley et al., "Certification Path Validation," RFC 3280 Internet X.509 Public Key Infrastructure, section 6, pp. 55-76.
International Search Report and Written Opinion for International Application No. PCT/US2009/054757 mailed on Mar. 31, 2010.
International Preliminary Report on Patentability for International Application No. PCT/US2009/054757 mailed on Apr. 5, 2011.
"Certification path validation algorithm," Wikipedia, Oct. 12, 2012, 2 pages, accessed at http://en.wikipedia.org/wiki/Certification_path_validation_algorithm.
"Class PolicyConstraints," 8 pages, accessed at http://javadoc.iaik.tugraz.at/iaik_jce/3.13/iaik/x509/extensions/PolicyConstraints.html.

* cited by examiner

Primary Examiner — Andrew Georgandellis (57) ABSTRACT

A method and apparatus for external organization (EO) path length (EOPL) validation are provided. A relying party node (RPN) stores a current EO path length constraint (EOPLC) value, and an EOPL counter that maintains a count of an actual external organization path length. The RPN obtains a chain of certificates that link a subject node (SN) to its trust anchor, and processes the certificates in the chain. When a certificate has a lower EOPLC than the current EOPLC value, the RPN replaces the current EOPLC value with the lower EOPLC. When the certificate currently being evaluated includes an enabled EO flag, the RPN increments the EOPL counter by one. The EOPL validation fails when the EOPL counter is greater than the current EOPLC value, and is successful when the last remaining certificate in the chain is processed without having the EOPL counter exceed the current EOPLC value.

15 Claims, 4 Drawing Sheets

(PRIOR ART)

METHOD AND APPARATUS FOR EXTERNAL ORGANIZATION PATH LENGTH VALIDATION WITHIN A PUBLIC KEY INFRASTRUCTURE (PKI)

FIELD OF THE DISCLOSURE

The present disclosure relates generally to communication networks and more particularly to methods and apparatus for path validation within a public key infrastructure (PKI) communication network.

BACKGROUND

Cryptography is the discipline which embodies principles, means, and methods for the transformation of data in order to hide its information content, prevent its undetected modification and/or prevent its unauthorized use. Keys are utilized in many forms of cryptography. A key is a sequence of symbols that controls the operation of a cryptographic transformation (e.g. encipherment, decipherment, cryptographic check function computation, signature generation, or signature verification).

Public-key cryptography, also known as asymmetric cryptography, is a form of cryptography in which a user has a pair of cryptographic keys—a public key and a private key. The private key is kept secret, while the public key may be widely accessible to the public. The keys are related mathematically, but the private key cannot be practically derived from the public key. A message encrypted with the public key can be decrypted only with the corresponding private key. Applications of public key cryptography include public key encryption and digital signatures. In public key encryption, to ensure confidentiality, a message encrypted with a recipient's public key cannot be decrypted by anyone except the recipient possessing the corresponding private key. A digital signature refers to a message signed with a sender's private key to ensure authenticity or "authenticate" the sender. The signed message can be verified by anyone who has access to the sender's public key thereby proving that the sender signed it and that the message has not been tampered with.

One issue with public-key cryptography is proving that a public key is authentic, and has not been tampered with or replaced by a malicious third party. To address this issue, modern cryptography and network security systems often employ certificate-based authentication mechanisms to verify that a public key belongs to a particular user. Such certificate-based authentication mechanisms are usually implemented as a public key infrastructure (PKI), in which one or more third parties, known as certificate or certification authorities (CAs), certify ownership of key pairs. A CA issues public key certificates, updates expired public key certificates, and creates, manages and distributes a certificate revocation list that repudiates unscrupulous users. The CA also generates public and private keys as needed. The public key certificates generated and issued by the CA are signed with a digital signature of the CA. A certificate signed by the issuer CA proves that the issuer CA trusts the subject that certificate is issued to. Any entity that trusts the CA can then assume that a public key in a given certificate is valid and is associated with the entity specified in that certificate.

The ITU Telecommunication Standardization Sector (ITU-T) is based in Geneva, Switzerland and coordinates standards for telecommunications on behalf of the International Telecommunication Union (ITU). X.509 is an ITU-T standard for public key infrastructure (PKI). The X.509 working group (PKIX) is a working group of the Internet Engineering Task Force (IETF) dedicated to creating Request for Comments (RFCs) and other standards documentation on issues related to public key infrastructure based on X.509 certificates. For example, a version of the X.509 standard is version 3 (X.509v3). All of the X.509 standards referred to herein are incorporated by reference herein in their entirety, and may be obtained at www.itu.int/rec/T-REC-X.509/en. X.509 specifies, among other things, standard formats for public key certificates and a certification path validation algorithm.

Path validation is a process whereby a path processing module in a device of a relying party takes a signed object, which may be a certificate, and traces its trust in the signature of that object back to one of the device's trust anchors (i.e., known trusted public keys) to verify that a given certificate "path" is valid under a given PKI. As used herein the terms "path" and "certificate path" refer to a sequence of a number (N) of certificates that starts with the subject certificate and proceeds through a number of intermediate certificates up to a trusted root certificate, issued by the trust anchor which is typically a trusted Certification Authority (CA). Path validation is necessary for a relying party to make an informed trust decision when presented with any certificate that is not already explicitly trusted. Section 6 of Request for Comments (RFC) 3280, "Internet X.509 Public Key Infrastructure Certificate and Certificate Revocation List (CRL) Profile", Housley, et. al., April 2002, defines a standardized path validation algorithm for X.509 certificates. Request for Comments (RFC) 3280 is incorporated by reference herein in its entirety. A copy of RFC 3280 may be obtained at http://www.ietf.org/rfc/rfc3280.txt. Path validation performed by a path processing module is complex and includes, among other things, determinations that certificates along the path meet name constraints, path length constraints, and policy constraints imposed by any certificate closer to the trust anchor along the path. Some aspects of the path validation algorithm specified in RFC 3280 will now be described with reference to FIG. 1.

Figure 1:
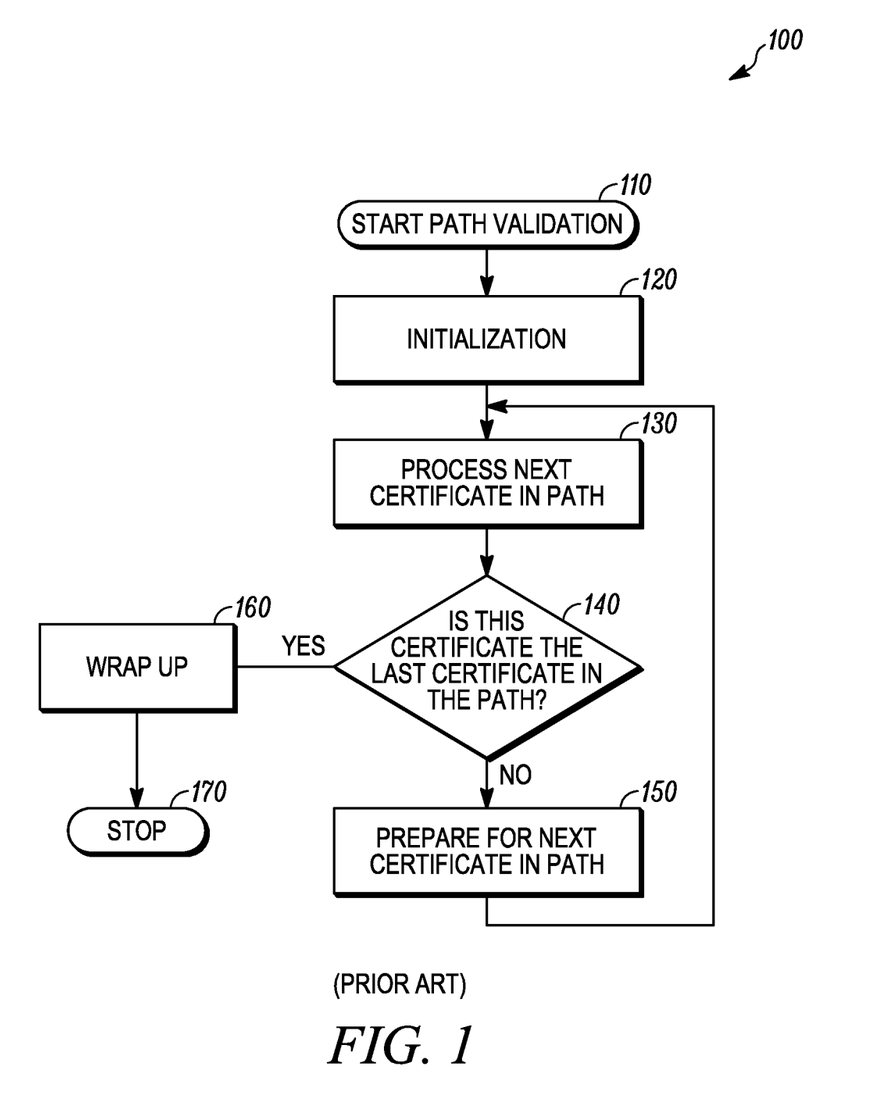
FIG. 1 illustrates a flow chart of a method for path validation with respect to chain of X.509 certificates.

FIG. 1 illustrates a flow chart of a method for path validation 100 with respect to a particular X.509 certificate in a chain of X.509 certificates. The method for path validation 100 can be performed by a path processing module implemented on a computer of a relying party that is attempting to validate an X.509 certificate through a chain of X.509 certificates.

Path validation 100 begins at step 110 where the path processing module receives input information as described in section 6.1.1 of RFC 3280. The input information received by the path processing module can include certificate path or "chain" to be evaluated (i.e., a prospective certification path of length N); the current date/time; a list of certificate policy object identifiers (OIDs) or "user-initial-policy-set" acceptable to the relying party (or any); trust anchor information about the trust anchor of the certificate path describing the CA that serves as the trust anchor for the certification path; and indicators regarding whether policy mapping is allowed and how/when/whether the "any" policy OID is to be tolerated. The list of certificate policy OIDs is a set of certificate policy identifiers naming the policies that are acceptable to the certificate user. The user-initial-policy-set contains a special value "any-policy" if the user is not concerned about certificate policy. The trust anchor information includes: (1) the trusted issuer name, (2) the trusted public key algorithm, (3) the trusted public key, and (4) optionally, the trusted public key parameters associated with the public key. The trust anchor information may be provided to the path processing module in the form of a self-signed certificate. The trusted anchor information is trusted because it was delivered to the path processing module by some trustworthy out-of-band procedure. If the trusted public key algorithm requires parameters, then the parameters are provided along with the trusted public key. The indicators regarding whether policy mapping is allowed can include: an initial-policy-mapping-inhibit indicator, which indicates if policy mapping is allowed in the certification path, an initial-explicit-policy indicator, which indicates if the path must be valid for at least one of the certificate policies in the user-initial-policy-set, and an initial-any-policy-inhibit indicator, which indicates whether the any-Policy OID should be processed if it is included in a certificate.

At step 120, the path processing module performs an initialization phase to establish state variables based upon the inputs provided at step 110. The state variables established during the initialization phase are described in section 6.1.2 of RFC 3280, and will not be described in detail here. One of the state variables that is generated is a maximum path length. The maximum path length is an integer initialized to a value "N", and is decremented ("N−1") for each non-self-issued certificate in the path, and may be reduced to a value in a path length constraint field specified within the basic constraints extension of a CA certificate. To explain further, a public key certificate includes a number of fields that are specified in the X.509 standards. One of these fields is a "path length constraint" field that is used to specify whether the public key subject to certification is to be used for signature by the certificate authority (CA) or by the user. The path length constraint (PLC) informs relying parties who trust a particular certification authority to only trust certificates that are signed by another CA if the other CA is within a particular path length (or number of CA hops) from the certification authority of the relying party.

At steps 130 through 170, the path processing module processes each certificate in the path, starting from the trust anchor. Each certificate is the path is individually processed at step 130 by performing a number of checks with respect to that certificate. These "checks" will be briefly summarized below, and more details are provided in section 6.1.3 of RFC 3280. Some or all of these checks can be performed depending on the particular implementation. In addition, the checks described below do not necessarily need to be performed in the particular order listed. Although not illustrated in FIG. 1, if any certificate in the path fails one of the checks performed during processing at step 130, the method for path validation 100 terminates and path validation fails.

At step 130, the path processing module processes the next certificate as in the path. (The first iteration of step 130 begins by processing the certificate of the trust anchor, and then continues for each certificate in the path as indicated by steps 140 and 150.) The certificate processing performed by the path processing module will now be briefly summarized; however, a more detailed explanation is provided in section 6.1.3 of RFC 3280. For each certificate, the path processing module checks: (1) the public key algorithm and parameters; (2) the current date/time against the validity period of the certificate; (3) revocation status to ensure the certificate is not revoked (e.g., by a certificate revocation list (CRL), online certificate status protocol (OCSP), or some other mechanism); (4) the issuer name to ensure that it equals the subject name of the previous certificate in the path; (5) name constraints to make sure the subject name is within the permitted subtrees list of all previous CA certificates and not within the excluded subtrees list of any previous CA certificate; (6) the asserted certificate policy OIDs against the permissible OIDs as of the previous certificate, including any policy mapping equivalencies asserted by the previous certificate; (7) policy constraints and basic constraints to ensure that any explicit policy requirements are not violated and that the certificate is a CA certificate, respectively; (8) the path length to ensure that it does not exceed any maximum path length asserted in this or a previous certificate; (9) the key usage extension to ensure that is allowed to sign certificates; and (10) any other critical extensions the certificate contains.

At step 140, the path processing module determines if the certificate is the last certificate in the path. If the certificate is the last certificate in the path, with no name constraint or policy violations or any other error condition, the method for path validation 100 proceeds to step 160, where the path processing module performs "wrap up" processing as described in section 6.1.5 of RFC 3280, and the certificate path validation method terminates successfully at step 170.

If the path processing module determines that the certificate is not the last certificate in the path, then the method for path validation 100 proceeds to step 150, where the path processing module performs processing to prepare for the next certificate as described in section 6.1.4 of RFC 3280. Among the many steps performed by the path processing module at step 150 to prepare for the next certificate, the path processing module verifies that the maximum path length (max_path_length) is greater than zero and decrements the maximum path length (max_path_length) by 1 if the certificate was not self-issued. If a path length constraint (pathLengthConstraint) is present in the certificate and is less than the maximum path length (max_path_length), the path processing module sets the maximum path length (max_path_length) to the value of the path length constraint (pathLengthConstraint).

Although the use a maximum path length constraint works well in many PKI systems, in certain scenarios using a maximum path length constraint may be inadequate or problematic.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Techniques are provided for use by a relying party node when validating an external organization path length (EOPL) during certification path validation. According to these techniques, when the relying party node receives an authentication request from a subject node seeking to be authenticated by the relying party node, the relying party node obtains a chain of certificates that link the subject node to a trust anchor (e.g., root certification authority) of the relying party node. Each of the certificates in the chain can be public key certificates issued by a certification authority, such as those described above that comply with the X.509 standards. Such certificate can include, for example, an issuer field that identifies a name of the certification authority that issued the digital public key certificate, a subject field that identifies a node trusted by the certification authority specified in the issuer field, a public key of the node specified in the subject field, a basic constraints field, and a digital signature of the certification authority comprising: a private key of the certification authority that issued the digital public key certificate. In accordance with some embodiments of the present invention, each of the certificates also include an external organization flag (EOF) that indicates whether the certificate was issued to a node affiliated with an external organization, and an external organization path length constraint (EOPLC) that specifies a value equal to a maximum allowable number of certificates within the chain of certificates that are permitted to include EOFs that are enabled (e.g., set to true). These fields are described in greater detail below.

The chain of certificates may include first through Nth certificates that link the subject node to the trust anchor of the relying party node. In the simplest case, the chain of certificates comprises at least one certificate that is issued to the subject node and that identifies the subject node as a subject, and another certificate that is issued and signed by the trust anchor of the relying party node. The trust anchor is affiliated with an organization, and the subject node is affiliated with an external organization.

The relying party node maintains in memory a current external organization path length constraint (EOPLC) value and an external organization path length (EOPL) counter. A current value of the EOPL counter is initialized at zero before evaluating any certificates in the chain.

On the first iteration of the method, the relying party node selects a first certificate in the chain of certificates and determines whether the first certificate comprises an external organization path length constraint (EOPLC). Depending on which end of the chain the method starts at, the first certificate can be either the certificate that is issued to the subject node and that identifies the subject node as a subject, or the certificate that is issued by the trust authority of the relying party node.

The current EOPLC value is initially set to infinity, and is replaced/updated whenever the relying party node encounters another certificate in the chain that has a lower EOPLC. In other words, the value of the EOPLC is allowed to decrease as the relying party node traverses the chain of certificates, but is not permitted to increase.

When the relying party node determines that the first certificate comprises an EOPLC, the relying party node determines whether the EOPLC from the first certificate is less than a current external organization path length constraint (EOPLC) stored in memory. When the relying party node determines that the EOPLC from the first certificate is less than the current value of the EOPLC stored in memory, the relying party node updates/replaces the current EOPLC value stored in memory with the EOPLC from the first certificate.

The EOPL counter maintains a count of an actual external organization path length as the relying party node is validating external organization path length. The current value of the EOPL counter is incremented by one each time the relying party node encounters a certificate in the chain that has an external organization flag (EOF) enabled. The relying party node then determines whether the first certificate comprises an external organization flag (EOF) that is enabled. If so, the relying party node increments the current value of an external organization path length (EOPL) counter by one, and determines whether a current value of the EOPL counter is less than or equal to the current value of the EOPLC stored in memory.

The relying party node determines that the external organization path validation has failed when the relying party node determines that the current value of the EOPL counter is greater than the current value of the EOPLC stored in memory. At this point the relying party node may transmit a message to the subject node that authentication has failed.

By contrast, when the relying party node determines that the current value of the EOPL counter is less than or equal to the current value of the EOPLC stored in memory, then the relying party node then determines whether the current certificate being processed is the last remaining certificate in the chain of certificates. When the last remaining certificate in the chain of certificates is processed, the relying party node can determine that the external organization path validation is successful.

When the relying party node determines that current certificate being processed is not the last remaining certificate in the chain of certificates, the relying party node selects a next certificate in the chain, and repeats the processing described above with respect to that certificate. The relying party node repeats this processing with respect to the each certificate in the chain until the relying party determines that external organization path validation has failed (i.e., when the relying party node determines that the current value of the EOPL counter is greater than the current value of the EOPLC stored in memory) or is successful (i.e., when the relying party node determines that the current certificate being evaluated is the last remaining certificate in the chain of certificates).

Embodiments of the present invention can apply to a number of network configurations. Prior to describing some embodiments with reference to FIG. 4, a few examples of network configurations in which these embodiments can be applied will now be described with reference to FIGS. 2-3.

Cross-Certification

Cross-certification extends third-party trust relationships between Certification Authority domains. For example, two organizations, each with their own CA, may want to validate certificates issued by the other organization's CA. Alternatively, a large, distributed organization may require multiple CAs in various geographic regions. Cross-certification allows different CA domains to establish and maintain trustworthy electronic relationships.

Figure 2:
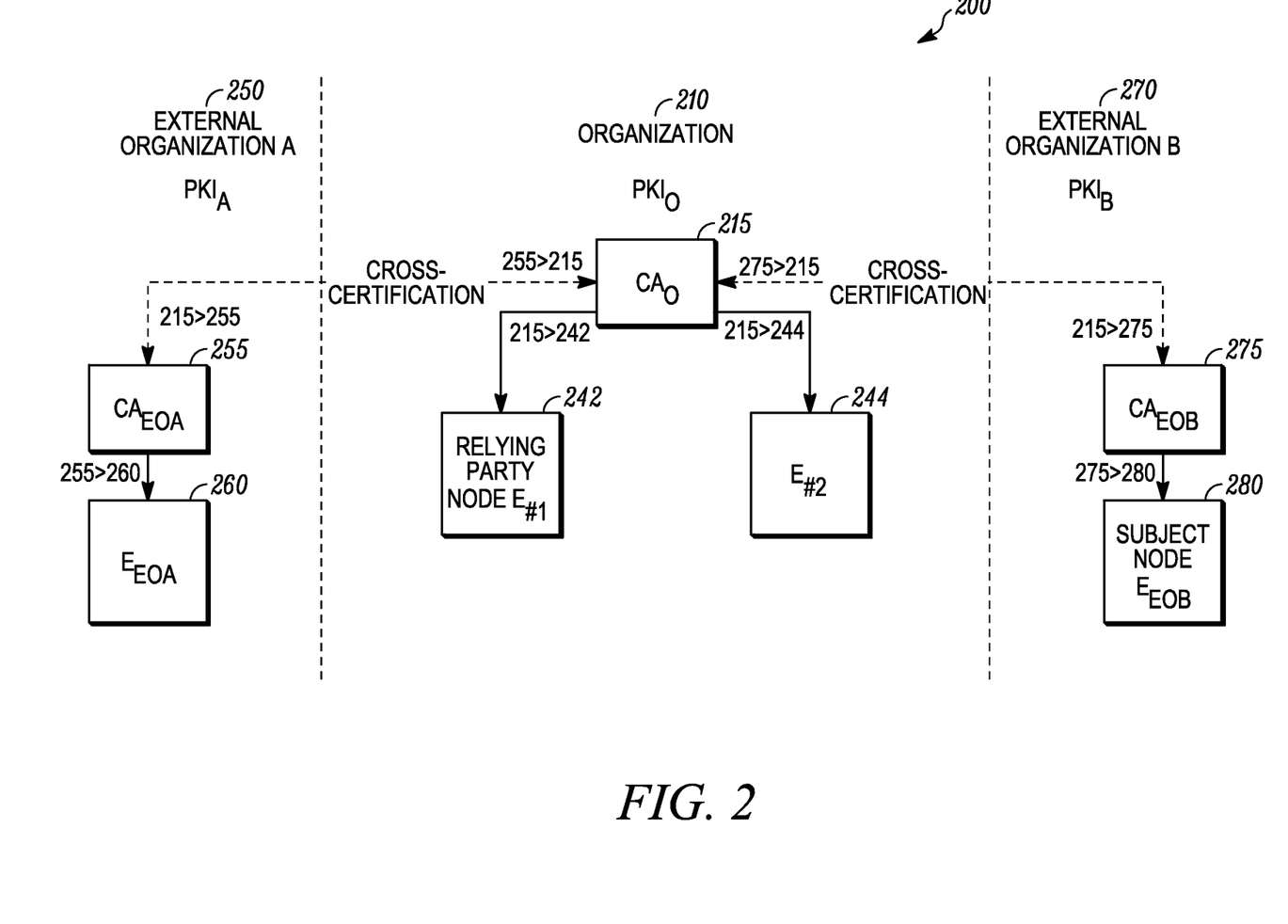
FIG. 2 is a block diagram which illustrates an example of an inter-organizational PKI network including an organization and two external organizations in a cross-certification scenario in which some embodiments can be applied.

FIG. 2 is a block diagram which illustrates an example of an inter-organizational PKI network including an organization 210 and two external organizations A, B 250, 270 in a cross-certification scenario in which some embodiments can be applied. As used herein, the term "certificate" refers to a public key certificate issued by a certification authority for certificate-based authentication usually implemented as part of a public key infrastructure (PKI) system. Throughout this application, the notation X>Y is used to specify a certificate issued by certification authority X to subject Y, where subject Y can be any node including another certification authority. A certificate X>Y signed by issuer X proves that the issuer X trusts subject Y of that certificate. A certificate X>Y signed by issuer X allows subject Y to "authenticate to" issuer X and/or nodes that trust issuer X, and thus allows issuer X and/or nodes that trust issuer X to "authenticate" subject Y. In this sense, "X authenticates Y" means that issuer X is proving the authenticity of subject Y, whereas "X authenticates to Y" means that subject Y is proving the authenticity of issuer X. Moreover, in FIGS. 2 and 3, single-ended solid-line arrows are used to illustrate that a certification authority is issuing a certificate to another node or certification authority, whereas double-ended dotted-line arrows are used to illustrate that two certification authorities are cross-signing and issuing certificates to each other.

In the network of FIG. 2, certification authority ($CA_O$) 215 of organization 210 implements a public key infrastructure ($PKI_O$), certification authority ($CA_{EOA}$) 255 of external organization A 250 implements a public key infrastructure ($PKI_A$), and certification authority ($CA_{EOB}$) 275 of external organization B 270 implements a public key infrastructure ($PKI_B$). Organization 210 includes nodes 242, 244 of its employees ($E_{\#1}$, $E_{\#2}$), external organization A 250 includes a node 260 of its employee ($E_{EOA}$), and external organization B 270 includes a node 280 of its employee ($E_{EOB}$). In most practical implementations, organization 210, external organization A 250 and external organization B 270 would have many more employees, but for simplicity of illustration only two employees are shown for organization 210 and only one employee is shown for each external organization 250, 270. In this example, certification authority ($CA_O$) 215 has issued a certificate (215>242) to node 242 of its employee ($E_{\#1}$) so that its other employees ($E_{\#2}$) can trust anyone having a certificate signed by certification authority ($CA_O$) 215, certification authority ($CA_{EOA}$) 255 has issued a certificate (255>260) to node 260 of its employee ($E_{EOA}$) so that its other employees (not shown) can trust anyone having a certificate signed by certification authority ($CA_{EOA}$) 255, and that certification authority ($CA_{EOB}$) 275 has issued a certificate (275>280) to node 280 of its employee ($E_{EOB}$) so that its other employees (not shown) can trust anyone having a certificate signed by certification authority ($CA_{EOB}$) 275.

If organization 210 would like to allow its employees 242, 244 to securely communicate with employees 260, 280 of external organizations A, B 250, 270, but does not want to issue certificates to every employee 260, 280 of external organizations A, B 250, 270, then certification authority ($CA_O$) 215 can cross-certify with certification authorities ($CA_{EOA}$, $CA_{EOB}$) 255, 275 of those external organizations A, B 250, 270.

For example, certification authority ($CA_O$) 215 of organization 210 and certification authority ($CA_{EOA}$) 255 of external organization A 250 establish a trust relationship securely exchanging their verification keys. These are the keys used to verify the respective CAs' signatures on certificates. To complete the operation, certification authority ($CA_O$) 215 and certification authority ($CA_{EOA}$) 255 each sign the other CA's verification key, and then exchange respective certificates 215>255, 255>215. This way, when certification authority ($CA_O$) 215 cross-signs with certification authority ($CA_{EOA}$) 255, the certification authority ($CA_O$) 215 will issue a first certificate (215>255) to the certification authority ($CA_{EOA}$) 255 that specifies the certification authority ($CA_O$) 215 as the issuer and the certification authority ($CA_{EOA}$) 255 as the subject. The certification authority ($CA_{EOA}$) 255 will issue a second certificate (255>215) to the certification authority ($CA_O$) 215 that specifies the certification authority ($CA_{EOA}$) 255 as the issuer and the certification authority ($CA_O$) 215 as the subject. As such, the pair of certificates shared between the certification authority ($CA_O$) 215 and the certification authority ($CA_{EOA}$) 255 are 215>255, 255>215.

Node 242 can verify the trustworthiness of a certificate 255>260 received from node 260 that was signed by certification authority ($CA_{EOA}$) 255 by validating another certificate 215>255 for certification authority ($CA_{EOA}$) 255 that was signed by certification authority ($CA_O$) 215. The certificate 215>255, 255>260 form a "chain" of certificates that each can be validated or checked by node 242 to ensure that certificate 255>260 received from node 260 is trusted. Node 242 knows that it can trust certificates signed by certification authority ($CA_{EOA}$) 255, such as the user certificate received from node 260 that was signed by certification authority ($CA_{EOA}$) 255.

When a certification authority signs and issues a certificate, the certification authority can set a path length constraint (PLC) parameter in the certificate. For example, when certification authority ($CA_O$) 215 signs the certificate 215>255 for certification authority ($CA_{EOA}$) 255, the certification authority ($CA_O$) 215 can set a path length constraint (PLC) parameter in the certificate 215>255. The PLC parameter is used to inform relying parties who trust certification authority ($CA_O$) 215, such as nodes 242, 244, to only trust certificates that are signed by another CA if the other CA is within a particular path length (or number of CA hops) from the certification authority ($CA_O$) 215 of the relying party, and not to trust certificates that are signed by another CA if the other CA is more than a particular path length from the certification authority ($CA_O$) 215 of the relying party.

As described above, one step in a certification path validation method such as that illustrated in FIG. 1 involves validating path length based on path length constraints specified in the chain of certificates that link a subject node seeking to be authenticated and a trust anchor of the relying party node. The "trust anchor" is an authoritative entity represented via a public key and associated data. In most cases, when there is a chain of trust in an organization, the root certification authority or top entity to be trusted in the organization usually becomes the trust anchor for nodes (including other certification authorities) that belong to that organization. The selection of a trust anchor is a matter of policy and in many cases the trust anchor can be the top CA in a hierarchical PKI; the CA that issued the verifier's own certificate(s); or any other CA in a network PKI. The path validation procedure is the same regardless of the choice of trust anchor. A relying party node uses a trust anchor to determine if a digitally signed object is valid by verifying a digital signature using the trust anchor's public key, and by enforcing the constraints expressed in the associated data for the trust anchor. Although a "trust anchor" does not necessarily have to be a root certification authority, for purposes of this description the terms "trust anchor" and "root certification authority" are used interchangeably.

An example of checking path length constraints will now be described with respect to FIG. 2. In this example, the certification authority ($CA_O$) 215 is the trust anchor for relying party node 242. When the relying party node 242 receives an authentication request from subject node 280, the relying party node 242 will determine whether to trust a certificate 275>280 from a subject node 280 that is signed by another certification authority ($CA_{EOB}$) 275.

The relying party node 242 obtains a chain of certificates 215>275, 275>280 that link the subject node 280 to the trust anchor certification authority ($CA_O$) 215 of the relying party node 242. Each certificate in the chain 215>275, 275>280 proves that the "issuer" trusts the subject of that certificate. For example, the certificate 275>280 that is issued and signed by certification authority ($CA_{EOB}$) 275 proves that certification authority ($CA_{EOB}$) 275 trusts the subject of that certificate, which is subject node 280. The chain of certificates is built in one direction starting with the certificate that identifies the subject node 280 and ending with a certificate signed by the trust anchor of the relying party node 242, which is certification authority ($CA_O$) 215 in this example.

In a particular chain of certificates, some certificates can include a path length constraint (PLC) while other certificates may not; however, in this example it is assumed that the certificates 215>275, 275>280 signed and issued by certification authority ($CA_O$) 215 and certification authority ($CA_{EOB}$) 275 both include path length constraint (PLC). The PLC specifies a value (i.e., an integer) equal to a maximum allowable number of certificates within a chain of certificates.

The relying party node 242 maintains in memory a current PLC value, and a path length (PL) counter. The relying party node 242 initializes the current PLC value by setting it to a large value, and then updates the current PLC value based on a PLC (if any) specified in a first certificate in the chain 215>275, 275>280, and continues to update the current PLC value if another certificate in the chain 215>275, 275>280 is encountered that has a lower PLC. The PL counter is initialized at zero and maintains a count of the actual path length as the relying party node 242 processes each certificate in the chain 215>275, 275>280. The PL counter is incremented by one each time the relying party node 242 processes a certificate in the chain.

The relying party node 242 selects the first certificate 215>275 in the chain that is issued and signed by the certification authority ($CA_O$) 215 of the relying party node 242, increments the PL counter by one, and determines whether the first certificate 215>275 contains a PLC. If the first certificate 215>275 does include a PLC, the relying party node 242 determines whether the PLC from the first certificate 215>275 is less than the current value of the PLC stored in memory, and if the PLC from the first certificate 215>275 is less than the current value of the PLC stored in memory, the relying party node 242 updates the PLC value stored in memory with the PLC from the first certificate 215>275. By contrast, if the first certificate 215>275 does not contain a PLC, the relying party node 242 does not adjust the current value of the PLC stored in memory.

Once the appropriate current value of the PLC stored in memory is determined, the relying party node 242 determines whether the current value of the PL counter is less than or equal to the current value of the PLC stored in memory. When the current value of the PL counter is greater than the current PLC stored in memory, then the path length validation fails, and the relying party node 242 may transmit a message to the subject node 280 that authentication has failed. By contrast, when the relying party node 242 determines that the current value of the PL counter is less than or equal to the current PLC stored in memory, the relying party node 242 determines whether the chain of certificates includes additional certificates to be evaluated and if so selects the next certificate 275>280 in the chain of certificates, and repeats the processing described above. This process continues until the relying party node 242 either: (1) determines that path length validation fails (i.e., the current value of the PL counter is greater than the current PLC stored in memory), or (2) determines that the current certificate being evaluated is the last remaining certificate in the chain of certificates and declares that path length validation is successful.

Some specific examples of how the path length validation method works will now be described. In each of the following examples, certification authority ($CA_{EOB}$) 275 include path length constraint (PLC) equal to one in the certificate 275>280 it issues to subject node 280.

For instance, consider an example where certification authority ($CA_{EOB}$) 275 includes path length constraint (PLC) equal to one in the certificate 275>280 it issues to subject node 280, and where the certificate 215>275 signed and issued by certification authority ($CA_O$) 215 to certification authority ($CA_{EOB}$) 275 includes a path length constraint (PLC) equal to one meaning that the chain of certificates can have a path length of one. The relying party node 242 selects the first certificate 215>275 in the chain that is issued and signed by the certification authority ($CA_O$) 215 of the relying party node 242, increments the PL counter to one, and determines that the first certificate 215>275 includes a PLC equal to one. Since the PLC from the first certificate 215>275 is less than the current value of the PLC stored in memory, the relying party node 242 updates the PLC value stored in memory with the value one (1) the PLC from the first certificate 215>275. The relying party node 242 determines whether the current value of the PL counter (1) is less than or equal to the current value (1) of the PLC stored in memory. Since the current value (1) of the PL counter is equal to the current PLC (1) stored in memory, the relying party node 242 selects the next certificate 275>280 in the chain of certificates and increments the PL counter by one to a value of two (2). The relying party node 242 determines that the next certificate 275>280 contains a PLC equal to one. Because the PLC from the next certificate 275>280 is not less than the current value of the PLC stored in memory, the relying party node 242 keeps the PLC value stored in memory equal to one (i.e., does not update it with the PLC from the next certificate 275>280), and determines whether the current value of the PL counter (2) is less than or equal to the current value (1) of the PLC stored in memory. Because the current value (2) of the PL counter is greater than the current PLC (1) stored in memory, path length validation fails, and the relying party node 242 may transmit a message to the subject node 280 indicating that authentication has failed.

Consider another example where certification authority ($CA_{EOB}$) 275 includes path length constraint (PLC) equal to two in the certificate 275>280 it issues to subject node 280, and where the certificate 215>275 signed and issued by certification authority ($CA_O$) 215 to certification authority ($CA_{EOB}$) 275 includes a path length constraint (PLC) equal to two meaning that the maximum allowable number of certificates within the chain of certificates is two.

The relying party node 242 selects the first certificate 215>275 in the chain that is issued and signed by the certification authority ($CA_O$) 215 of the relying party node 242, increments the PL counter to one, and determines that the first certificate 215>275 includes a PLC equal to two (2). The relying party node 242 determines that the PLC from the first certificate 215>275 is less than the current value of the PLC stored in memory, and updates the PLC value stored in memory with the PLC (2) from the first certificate 215>275. Once the appropriate current value (2) of the PLC stored in memory is determined, the relying party node 242 determines that the current value of the PL counter (1) is less than the current PLC (2) stored in memory, and therefore determines whether the chain of certificates includes additional certificates to be evaluated. Because the chain includes additional certificate 275>280, the relying party node 242 selects the next certificate 275>280 in the chain of certificates, and increments the PL counter by one to a value of two (2). The relying party node 242 determines that the next certificate 275>280 include a PLC equal to two (2), but does not adjust the current value of the PLC stored in memory since the PLC from the next certificate 275>280 is not less than the current value of the PLC stored in memory, but is the same and therefore the relying party node 242 does not need to update the PLC value stored in memory with the PLC from the next certificate 275>280. The relying party node 242 then determines whether the current value (2) of the PL counter is less than or equal to the current value (2) of the PLC stored in memory. Because the relying party node 242 determines that the current value (2) of the PL counter is equal to the current PLC (2) stored in memory, the relying party node 242 determines whether the chain of certificates includes additional certificates to be evaluated. Because the certificate 275>280 is the last certificate in the chain of certificates, the relying party node 242 determines that path length validation is successful.

The network 200 configuration illustrated in FIG. 2 represents "simple" organizational PKI structure where the PKI for each organization has a single certification authority (CA). However, in many scenarios, each organization has a PKI that is significantly more complex and implements multiple certification authorities (CAs) distributed in a hierarchical arrangement with a "root" CA at the top of the hierarchical arrangement. In some cases, the root CA is sometimes also the "trust anchor" for each node in the PKI. For instance, one example of a complex PKI would be that of a large multinational corporation with several subsidiaries that possibly operate in different countries, where each subsidiary can have multiple divisions or business units each having its own CA. In this scenario, each division or business unit can have its own CA that is subordinate to a CA for the subsidiary, where each subsidiary CA is subordinate to an overall "root" certification authority (CA) of the organization at the top of the hierarchical arrangement. As will be appreciated by those skilled in the art, this arrangement could be more complex depending on the structure of the organization and need for authentication between different entities within the organization. One example of a more complex inter-organizational PKI network will now be described with reference to FIG. 3.

Figure 3:
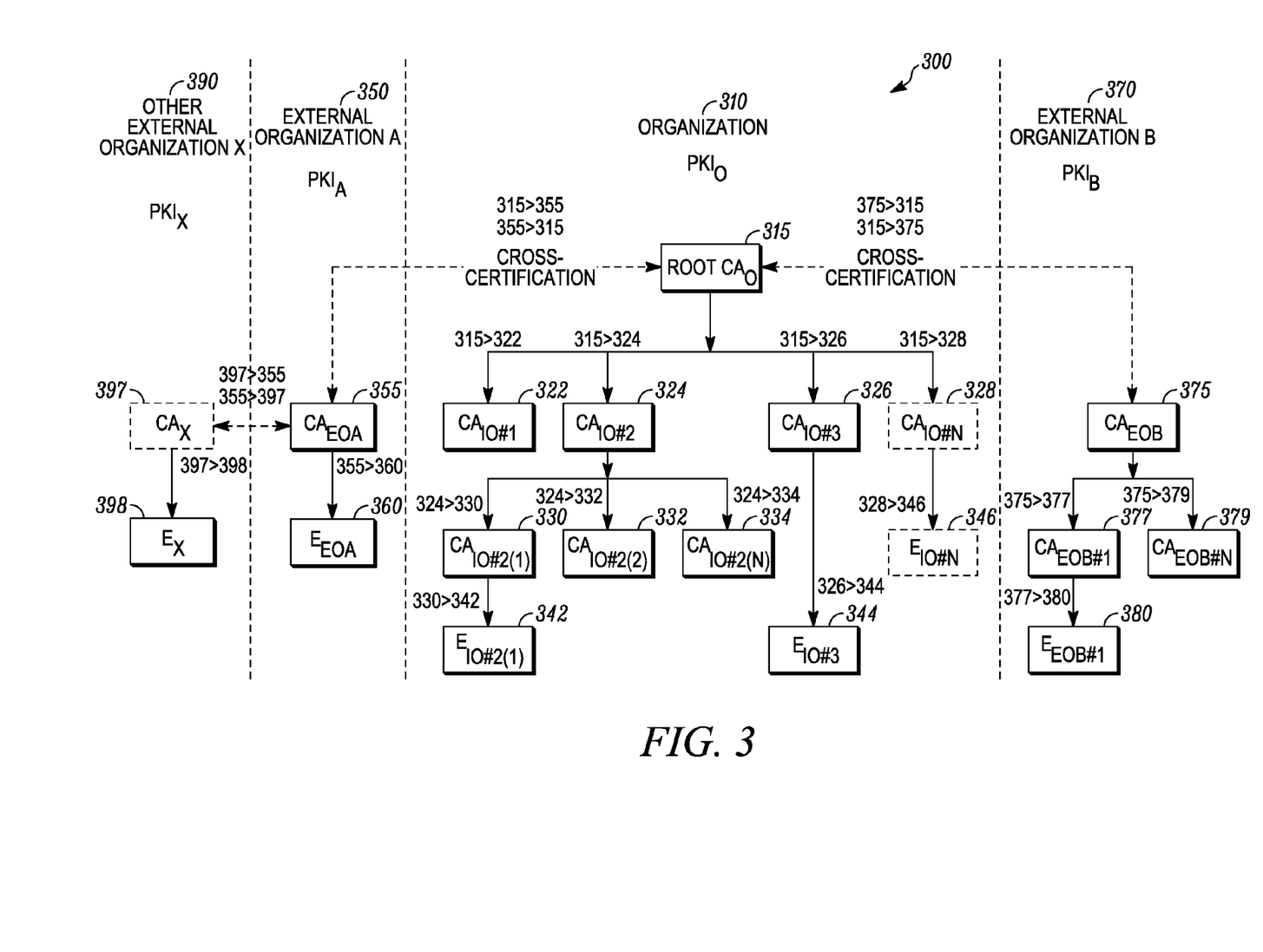
FIG. 3 is a block diagram which illustrates an example of an inter-organizational PKI network including public key infrastructure networks $PKI_A$, $PKI_B$, $PKI_O$, $PKI_X$ of different organizations in which some embodiments can be applied.

FIG. 3 is a block diagram which illustrates an example of an inter-organizational PKI network 300 including public key infrastructure networks $PKI_A$, $PKI_B$, $PKI_O$, $PKI_X$ of different organizations 310, 350, 370, 390 in which some embodiments can be applied.

Root certification authority (ROOT $CA_0$) 315 of organization 310 implements a public key infrastructure ($PKI_O$), certification authority ($CA_{EOA}$) 355 of external organization A 350 implements a public key infrastructure ($PKI_A$), certification authority ($CA_{EOB}$) 375 of external organization B 370 implements a public key infrastructure ($PKI_B$) and certification authority ($CA_X$) 397 of external organization B 390 implements a public key infrastructure ($PKI_X$). In this example, root certification authority (ROOT $CA_0$) 315 has four directly subordinate internal organization certification authorities $CA_{IO\#1}$, $CA_{IO\#2}$, $CA_{IO\#3}$, $CA_{IO\#N}$, and three indirectly subordinate internal organization certification authorities $CA_{IO\#2(1)}$, $CA_{IO\#2(2)}$, $CA_{IO\#2(3)}$ associated with directly subordinate internal organization certification authority $CA_{IO\#2}$. In this example, the directly subordinate internal organization certification authorities $CA_{IO\#1}$, $CA_{IO\#2}$, $CA_{IO\#3}$, $CA_{IO\#N}$, can be assumed to be certification authorities for different business units, and the indirectly subordinate internal organization certification authorities $CA_{IO\#2(1)}$, $CA_{IO\#2(2)}$, $CA_{IO\#2(3)}$ can be assumed to be certification authorities for different departments of internal organization IO#2. It will be appreciated that other indirectly subordinate internal organization certification authorities could reside below the indirectly subordinate internal organization certification authorities illustrated in FIG. 3 to create an even more complex PKI ($PKI_O$). External organization certification authority ($CA_{EOA}$) 355 and external organization certification authority ($CA_{EOB}$) 375 have both cross-certified with root certification authority (ROOT $CA_0$) 315 by exchanging certificates 315>355, 355>315 and 375>315, 315>375, respectively.

In this example, external organization certification authority ($CA_{EOA}$) 355 has another partner certification authority $CA_X$ 397 that is associated with another external organization X 390 that is not associated with or authenticated by organization 310 by cross-certification. In this example, external organization certification authority ($CA_{EOB}$) 375 has two directly subordinate external organization certification authorities $CA_{EOB\#1}$, 377, $CA_{EOB\#N}$ 379. It will be appreciated that indirectly subordinate internal organization certification authorities could reside below the directly subordinate external organization certification authorities $CA_{EOB\#1}$, $CA_{EOB\#N}$ illustrated in FIG. 3 to create an even more complex PKI ($PKI_B$). It will also be appreciated that other certification authorities (that are not associated with organization 310) could be associated (either directly or indirectly) with external organization certification authorities $CA_{EOA}$, $CA_{EOB}$, $CA_{EOB\#1}$, $CA_{EOB\#2}$, $CA_X$ illustrated in FIG. 3 to create an even more complex PKIs ($PKI_{A,B,X}$).

For purposes of simplicity, the example network 300 of FIG. 3 illustrates a node 360 of employee ($E_{EOA}$) associated with the certification authority ($CA_{EOA}$) 355 of external organization A 350, a node 342 of employee ($E_{IO\#2(1)}$) associated with the root certification authority (ROOT $CA_0$) 315 of organization 310 indirectly via the certification authority ($CA_{IO\#2(1)}$) 330 through the certification authority ($CA_{IO\#2}$) 324, a node 344 of employee ($E_{IO\#3}$) associated with the root certification authority (ROOT $CA_0$) 315 of organization 310 indirectly via the certification authority ($CA_{IO\#3}$) 326, a node 380 of employee ($E_{EOB\#1}$) associated with the root certification authority (ROOT $CA_0$) 315 of organization 310 indirectly via the certification authority ($CA_{EOB\#1}$) 377 and certification authority ($CA_{EOB}$) 375, and a node 398 of employee ($E_X$) associated with the root certification authority (ROOT $CA_0$) 397 of external organization 390 indirectly via the certification authority ($CA_{EOB\#1}$) 377 and certification authority ($CA_{EOB}$) 375. However, as will be appreciated by those skilled in the art, in many practical implementations of the example network 300 of FIG. 3, each CA would have multiple employees having nodes associated therewith. In many implementations, the organization 310 would have more than three employees, but for simplicity of illustration only three employees 342, 344, 346 are illustrated. Likewise, in many implementations, the external organization A 350, the external organization B 370 and the external organization X 390 would each have more than one employee 360, 380, 398, but for simplicity of illustration only one employee is shown for each external organization A, B, X 350, 370, 390.

In this example, it can be assumed that certification authority ($CA_{EOA}$) 355 has issued a certificate 355>360 to node 360 of its employee ($E_{EOA}$) so that its other employees (not shown) can trust anyone presenting a certificate signed by certification authority ($CA_{EOA}$) 355, that certification authority ($CA_{EOB\#1}$) 377 has issued a certificate 377>380 to node 380 of its employee ($E_{EOB\#1}$) so that its other employees (not shown) can trust anyone presenting a certificate signed by certification authority ($CA_{EOB\#1}$) 377, and that the root certification authority (ROOT $CA_0$) 397 of external organization 390 has issued a certificate 397>398 to node 398 so that its other employees (not shown) can trust anyone presenting a certificate signed by the root certification authority (ROOT $CA_0$) 397. Further, the certification authority ($CA_0$) 315 has cross-certified with certification authorities ($CA_{EOA}$, $CA_{EOB}$) 355, 375 of external organizations A, B 350, 370 by issuing certificates 315>355, 315>375 and receiving certificates 355>315, 375>315, respectively.

Consider an example in which certification authority ($CA_{EOA}$) 355 sets the PLC in certificate 355>315 equal to four (4) so that nodes 342 within organization 310 can authenticate to nodes belonging to organization A 350, such as node 360. Although the path length constraint can provide access to nodes 342, and 344 of organization 310, it can also allow a node 380 of external organization B 370 to authenticate to nodes belonging to organization 350, such as node 360 even though CA 355 never intended to allow node 380 of external organization B 370 to authenticate with nodes belonging to organization 350.

To address this issue, one conventional approach is for the certification authority ($CA_{EOA}$) 355 to set a name constraint field in the certificate 355>315 it signs for the root certification authority (ROOT $CA_0$) 315 which indicates that the user name field in the certificate 355>315 must end with a particular "name space" or domain name (organization.com) associated with the organization 310 to be "trusted." Any certificates that do not have a user name that ends with the particular domain name (organization.com) are not trusted and the certificate is rejected. For instance, if the node 380 of employee ($E_{FOB\#1}$) presents a certificate that has a user name that ends with externalorganizationB.com to the certification authority ($CA_{EOA}$) 355, the node 380 of employee ($E_{EOB\#1}$) would be denied access to systems or resources of external organization A 350 since it does not match the name constraint.

However, in some scenarios, the structure of an organization can change over time. For example, new entity (e.g., new subsidiaries or business units) can be added to the organization. When this happens an existing CA of the new entity is often absorbed into the organization's PKI. This concept is illustrated in FIG. 3 by $CA_{IO\#N}$ 328, which represents the certification authority of a new business unit that is added to $PKI_O$ of organization 310, when a new business unit, internal organization #N (IO#N), is acquired by organization 310 and merged into organization 310. Internal organization #N (IO#N) may decide to maintain its domain name (organization#N.com), and employees of internal organization #N (IO#N), such as $E_{IO\#N}$, will continue to use their existing user names (e.g., EIO#N organization#N.com). In this situation, employees of internal organization #N (IO#N), such as EIO#N, will not be trusted (i.e., their certificates will be rejected) and they will not be allowed to access systems or resources of external organization A 350. As noted above, the name constraint field of the certificate 355>315 signed by the certification authority ($CA_{EOA}$) 355 for the root certification authority (ROOT $CA_0$) 315 indicates that the user name field of the certificate must end with the particular domain name (organization.com) associated with the organization 310 in order to be "trusted." In this example, the user name field will have the domain name organization#N.com, and therefore will not match the particular domain name (organization.com) specified by the certification authority ($CA_{EOA}$) 355 in the name constraint field of the certificate 355>315 it signed for the root certification authority (ROOT $CA_0$) 315.

Thus, in many cases, it is undesirable to simply use a name constraint field to indicate that the user name field in a certificate must end with the particular domain name in order to be "trusted." For instance, employees of a new business unit that joins an organization (e.g., $E_{IO\#N}$ 346) will not be granted the same privileges as pre-existing employees of the organization.

The root certification authority (ROOT $CA_0$) 315 reissue certificates to all employees of internal organization #N (IO#N), such as EIO#N, with an appropriate name constraint field. Alternatively, organization 310 could ask other external organizations to reissue a new "cross organization" certificates with a name space constraint indicating that domain name (organization#N.com), and employees of internal organization #N (IO#N), such as EIO#N, is also allowed. It would be desirable to void either of these approaches particularly when organization 310 has arrangements with many other external organizations and/or when organization 310 frequently integrates new internal organizations within its public key infrastructure ($PKI_O$).

Thus, there is no easy way for the organization 310 to let external organizations 350, 370 know whether organization 310 has issued certificates to a new subordinate internal organization that is part of organization 310 versus a scenario where the organization 310 has issued certificates to an external organization that is not part of organization 310. For instance, the certification authority ($CA_{EOB}$) 375 can not simply examine a chain of certificates and distinguish between a certificate 315>324 issued by the root certification authority (ROOT $CA_0$) 315 to certification authority ($CA_{IO\#2}$) 324) versus a certificate 315>355 that the root certification authority (ROOT $CA_0$) 315 has issued to the certification authority ($CA_{EOA}$) 355 that belongs to an external organization (EOX) since both certificates are issued to entities that are one path length away.

The external certification authority may be persuaded to add other additional allowed domain names (i.e., organization#N.com) to the name constraint field, and then go through the process of redistributing updated certificates, but this approach requires cooperation from and places an unnecessary administrative burden on the external certification authority particularly when the organization 310 is large and frequently changes by adding new internal organizations. This is also problematic from the perspective of the organization 310 when the organization 310 maintains relationships with a large number of external organizations and therefore must request that the various certification authorities of different external organizations add other additional allowed domain names (i.e., organization#N.com) to the name constraint field, and then go through the process of redistributing updated certificates.

Figure 4:
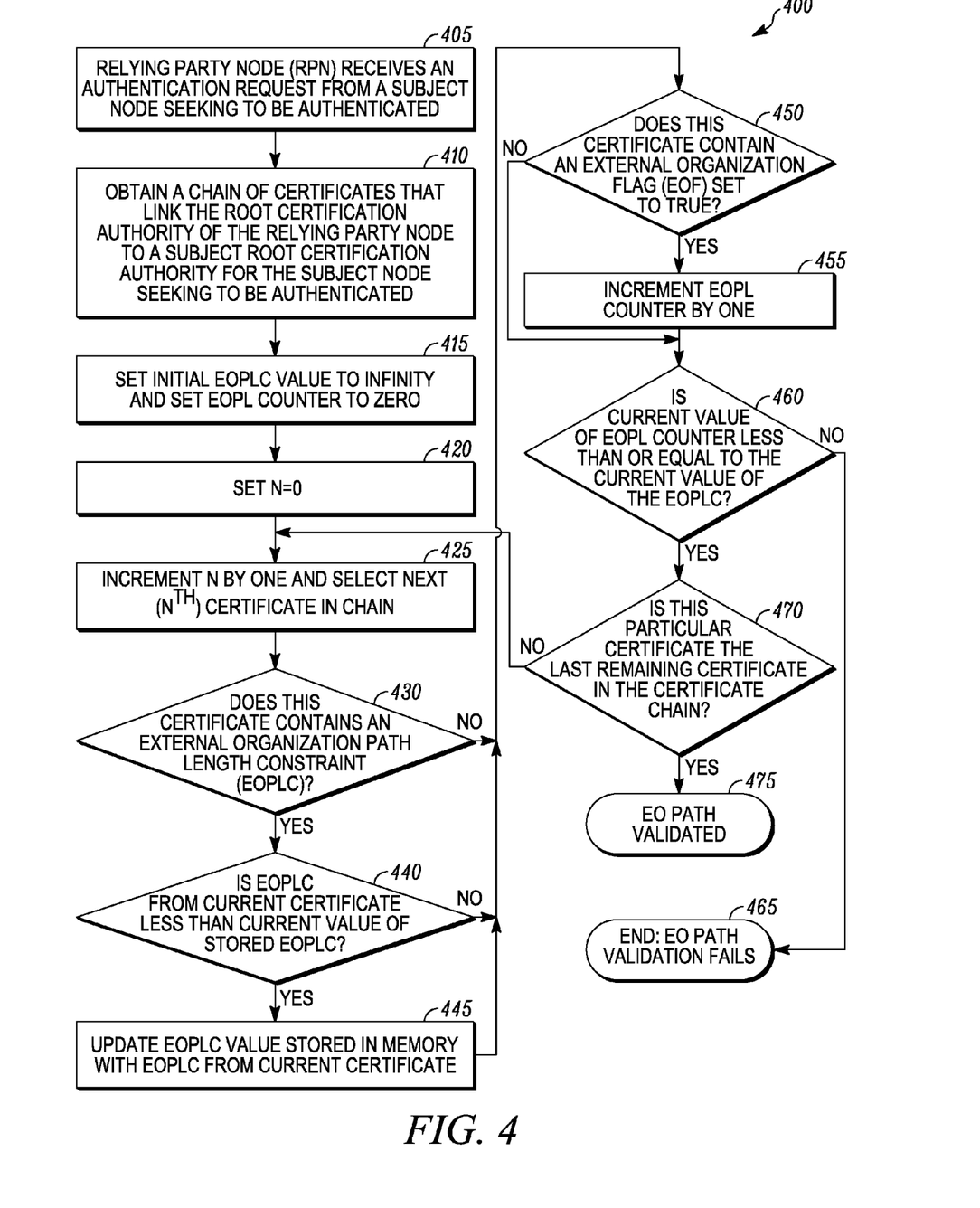
FIG. 4 is a flow chart which illustrates a method for validating external organization path length in accordance with some embodiments.

FIG. 4 is a flow chart which illustrates a method 400 for validating external organization path length in accordance with some embodiments. Method 400 can be implemented, for example, as part of a certification path validation method such as that illustrated in FIG. 1.

Method 400 begins at step 405 when a relying party node receives an authentication request from a subject node seeking to be authenticated by the relying party node. As used herein, the term "subject node" refers to a node that is seeking to be authenticated, and the term "relying party node (RPN)" refers to a node that is attempting to authenticate the subject node.

At step 410, the relying party node obtains a chain of certificates that link the subject node to a trust anchor of the relying party node. The relying party node may obtain the chain of certificates from another entity or construct it using other techniques known by those skilled in the art. Techniques for obtaining the chain of certificates from another entity or constructing a chain of certificates are described, for example, in the above-referenced RFC 3280, and Request for Comments (RFC) 4158, "Internet X.509 Public Key Infrastructure: Certification Path Building," which is also incorporated by reference herein in its entirety. A copy of RFC 4158 may be obtained at http://www.ietf.org/rfc/rfc4158.txt The "trust anchor" is an authoritative entity represented via a public key and associated data. In most cases, when there is a chain of trust in an organization, the root certification authority or top entity to be trusted in the organization usually becomes the trust anchor for nodes (including other certification authorities) that belong to that organization. A relying party node uses a trust anchor to determine if a digitally signed object is valid by verifying a digital signature using the trust anchor's public key, and by enforcing the constraints expressed in the associated data for the trust anchor. Although a "trust anchor" does not necessarily have to be a root certification authority, for purposes of this description the terms "trust anchor" and "root certification authority" are used interchangeably.

In general, a "chain of certificates" will be a set of N certificates that link a subject node to the trust anchor or root certification authority of a relying party node unless the subject node has a certificate signed by the trust anchor or root certification authority of a relying party node. The chain includes at least one certificate, and in many cases includes more than one certificate. Each certificate in the chain proves that the "issuer" trusts the subject of that certificate. For example, a certificate X>Y that is issued and signed by X proves that X trusts the subject Y of that certificate. The chain of certificates is built in one direction starting with the certificate that identifies the subject node and ending with a certificate signed by the trust anchor or root certification authority of a relying party node. As such, if two nodes are mutually authenticating each other, the chain of certificates for one of the nodes can be different than the chain of certificates for the other nodes, and one chain of certificates can include more, less or the same number of certificates as the other chain of certificates.

In accordance with embodiments of the present invention, a certificate signed and issued by a trust anchor or root certification authority may comprise an external organization flag (EOF) and/or an external organization path length constraint (EOPLC). The issuer CA can enable the EOF (e.g., set the EOF to "true") whenever the issuer CA signs a certificate of a node affiliated with an external organization to indicate that the certificate was issued to an external organization. For example, each time a CA issues a certificate to a node that belongs to an external organization, the CA will enable an EOF in the certificate. When a CA issues a certificate to nodes that are part of its organization, the certification authority can set the EOF to false (i.e., leave it disabled) so that external organizations will think that the nodes are part of the organization.

When evaluating a chain of certificates, an enabled EOF (e.g., when EOF is set to "true") indicates that organizations are changing, and the total number of certificates in the chain that have an EOF enabled allow a replying party node to determine how many times organizations are changing across the chain. The EOPLC specifies a value (i.e., an integer) equal to a maximum allowable number of certificates within a chain of certificates that are permitted to include an EOF that is enabled. In other words, the EOPLC specifies a value that constrains the number of certificates within the chain that are allowed to contain an enabled EOF (e.g., true). In a particular chain of certificates, some certificates can include an external organization path length constraint (EOPLC) while other certificates do not include an EOPLC. Similarly, some certificates can have an EOF enabled (e.g., set to true), while others have the EOF disabled (e.g., set to false).

The relying party node maintains in memory a current EOPLC value, and an external organization path length (EOPL) counter. The current EOPLC value is initially set based on an EOPLC specified in a first certificate in the chain, and may be updated as the method 400 executes if another certificate is encountered that has a lower EOPLC. The EOPL counter is initialized at zero and maintains a count of the actual external organization path length as the relying party node is validating external organization path length. As described below, the EOPL counter is incremented by one each time the relying party node encounters a certificate in the chain that has an EOF enabled.

As indicated as step 415, before evaluating any certificates in the chain of certificates, the relying party node initializes the current EOPLC value by setting it to infinity and initializes the EOPL counter by setting it to zero. The EOPLC is initially set to infinity to indicate that initially there is no constraint on the External Organization Path Length (EOPL). The EOPL is set to zero to indicate that no certificates with an EOF flag have been processed yet.

The method 400 then proceeds to steps 420 and 425. On the first iteration of method 400 steps 420 and 425 take place together to represent the step of "selecting the first certificate in the chain." In other words, at step 420, a variable N is set to zero, and at step 425 N is incremented to one to select the first certificate in the chain. This is done because the chain of certificates must start at some point. In one implementation, the first certificate is a certificate in the chain of certificates that is issued and signed by the root certification authority of the relying party node. In another implementation, the first certificate is a certificate in the chain of certificates that is issued to the subject node that is seeking to be authenticated. It is to be noted that during subsequent iterations of method 400, steps 420 and 425 do not take place together, and as indicated by the "NO" arrow out of step 470, only step 425 takes place to select the next certificate in the chain.

When the relying party node selects the first certificate in the chain of certificates, the method 400 proceeds to step 430, where the relying party node determines whether the first certificate contains an EOPLC, and if not, the method proceeds directly to step 450. However, if the relying party node determines that the first certificate does contain an EOPLC, then the method 400 first proceeds to step 440, where the relying party node determines whether the EOPLC from the current (i.e., first on the first iteration) certificate is less than the current value of the EOPLC stored in memory. When the relying party node determines that the EOPLC from the current certificate is greater than or equal to the current EOPLC stored in memory, the method 400 proceeds directly to step 450. By contrast, when the relying party node determines that the EOPLC from the current certificate is less than the current value of the EOPLC stored in memory, the method 400 proceeds to step 445, where the relying party node updates the EOPLC value stored in memory with the EOPLC from the current certificate. The value of the EOPLC is allowed to decrease as the relying party node traverses the chain of certificates, but is not permitted to increase. Whenever a certificate includes an EOPLC of value X, this mandates that the EO Path length of a valid certificate chain should be X or less. Thus, to adhere to this constraint it would not be possible for a certificate subsequent in a chain to raise the EOPLC from one asserted earlier. The method 400 then proceeds to step 450.

At step 450, the relying party node determines whether the current certificate being evaluated includes an EOF that is enabled (e.g., set to true). If not, the method 400 proceeds directly to step 460. The "NO" loop out of step 450 allows the relying party node to skip incrementing EOPL when the certificate being processed does not contain an enabled EOF. If the current certificate being evaluated includes an EOF that is enabled (i.e., set to true), the method 400 proceeds to step 455, where the relying party node increments the EOPL counter by one. For instance, the first time the relying party node encounters a certificate that has an EOF enabled (set to true), the relying party node will increment the EOPL counter by one such that the EOPL counter will indicate that the actual EOPL is now one (1) meaning that the actual external organization path length so far in this chain of certificates is currently one (1). The method 400 then proceeds to step 460.

At step 460, the relying party node determines whether the current value of the EOPL counter is less than or equal to the current value of the EOPLC stored in memory.

When the relying party node determines that the current value of the EOPL counter is greater than the current EOPLC stored in memory, then the external organization path validation fails, and the method 400 ends at step 465. At this point, the relying party node may transmit a message to the subject node that authentication has failed.

When the relying party node determines that the current value of the EOPL counter is less than or equal to the current EOPLC stored in memory, the method 400 proceeds to step 470, where the relying party node determines whether the current certificate being evaluated is the last remaining certificate in the chain of certificates.

When the relying party node determines that the current certificate being evaluated is not the last remaining certificate in the chain of certificates, the method 400 loops back to step 425, where the relying party node selects the next certificate in the chain of certificates and steps 430-470 are repeated with respect to that certificate. This process continues until the relying party node either: (1) determines that external organization path validation fails (i.e., the current value of the EOPL counter is greater than the current EOPLC stored in memory) and the method 400 ends at step 465, or (2) determines that EO path validation was successful when the relying party node determines that the current certificate being evaluated is the last remaining certificate in the chain of certificates and the method 400 ends at step 475.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An external organization path length (EOPL) validation method, comprising:

storing, in memory at a relying party node, a current external organization path length constraint (current EOPLC) value, and an external organization path length (EOPL) counter that maintains a count of an actual external organization path length;

receiving, at the relying party node, an authentication request from a subject node affiliated with an external organization that is external to an organization of the relying party node and seeking to be authenticated by the relying party node;

obtaining, at the relying party node, a chain of certificates that link the subject node to a trust anchor affiliated with the organization of the relying party node, wherein both the organization and the external organization comprise at least one node and at least one trust anchor;

initially setting the current EOPLC value to infinity and the EOPL counter to zero before processing any certificates in the chain; and processing the certificates in the chain by:
selecting a current certificate in the chain of certificates to be evaluated, wherein a certificate in the chain of certificates comprises an external organizational flag (EOF) and an external organization path length constraint (EOPLC) value, and further wherein an enabled EOF indicates that the certificate was issued to a node affiliated with an external organization and the EOPLC value specifies a maximum allowable number of certificates within the chain of certificates that are permitted to include EOFs that are enabled;

replacing the current EOPLC value stored in memory with an EOPLC value from the current certificate when the current certificate has a lower EOPLC value than the current EOPLC value; and incrementing the EOPL counter by one each time the certificate currently being evaluated comprises an EOF that is enabled.

2. An EOPL validation method according to claim 1, wherein the step of processing the certificates in the chain further comprises:

determining whether the EOPL counter is less than or equal to the current EOPLC value stored in memory; and determining that the external organization path validation has failed when the EOPL counter is greater than the current EOPLC value stored in memory.

3. An EOPL validation method according to claim 2, wherein the step of processing the certificates in the chain further comprises:

determining whether the current certificate being evaluated is the last remaining certificate in the chain of certificates when the EOPL counter is less than or equal to the current EOPLC value stored in memory; and determining that the external organization path validation is successful when the current certificate being evaluated is the last remaining certificate in the chain of certificates.

4. An EOPL validation method according to claim 1, wherein processing the certificates in the chain further comprises selecting a next certificate in the chain when the relying party node determines that the current certificate being evaluated is not the last remaining certificate in the chain of certificates.

5. An EOPL validation method according to claim 1, wherein the chain of certificates comprise at least:
one certificate that is issued to the subject node and that identifies the subject node as a subject, and
another certificate that is issued and signed by the trust anchor of the relying party node.

6. An EOPL validation method according to claim 1, wherein the chain of certificates comprise first through Nth certificates that link the subject node to the trust anchor of the relying party node.

7. An EOPL validation method according to claim 1, wherein the first certificate is the certificate that is issued to the subject node and that identifies the subject node as a subject.

8. A method for validating an external organization path length (EOPL) at a relying party node during certification path validation, comprising:

maintaining, in memory at the relying party node, a current external organization path length constraint (current EOPLC) value and an external organization path length (EOPL) counter that maintains a count of an actual external organization path length as the relying party node is validating external organization path length, wherein the current EOPLC value is initially set to infinity, and wherein a current value of the EOPL counter is initially set to zero before evaluating any certificates in the chain;

receiving, at the relying party node, an authentication request from a subject node seeking to be authenticated by the relying party node;

obtaining, at the relying party node, a chain of certificates that link the subject node to a trust anchor of the relying party node, wherein the trust anchor is affiliated with an organization, and wherein the subject node is affiliated with an external organization that is external to the organization and wherein both the organization and the external organization comprise at least one node and at least one trust anchor;

selecting, at the relying party node, a first certificate in the chain of certificates, wherein a certificate in the chain of certificates comprises an external organizational flag (EOF) and an external organization path length constraint (EOPLC) value, and further wherein an enabled EOF indicates that the certificate was issued to a node affiliated with an external organization and the EOPLC value specifies a maximum allowable number of certificates within the chain of certificates that are permitted to include EOFs that are enabled;

determining, at the relying party node, whether an external organization path length constraint (EOPLC) from the first certificate is less than the current EOPLC value stored in memory;

updating the current EOPLC value stored in memory of the relying party node with the EOPLC from the first certificate when the relying party node determines that the EOPLC from the first certificate is less than the current EOPLC value stored in memory;

incrementing by one, at the relying party node, a current value of an external organization path length (EOPL) counter when the first certificate comprises an external organization flag (EOF) that is enabled;

determining, at the relying party node, whether a current value of the EOPL counter is less than or equal to the current EOPLC value stored in memory, and determining that external organization path validation has failed when the relying party node determines that the current value of the EOPL counter is greater than the current value of the EOPLC stored in memory;

determining, at the relying party node, whether the first certificate is the last remaining certificate in the chain of certificates when the relying party node determines that the current value of the EOPL counter is less than or equal to the current value of the EOPLC stored in memory, and determining that external organization path validation was is successful when the first certificate is the last remaining certificate in the chain of certificates; and selecting, at the relying party node, a next certificate in the chain when the relying party node determines that the first certificate is not the last remaining certificate in the chain of certificates.

9. A method according to claim 8, wherein further comprising:

repeating steps of updating through selecting with respect to the each certificate in the chain until the relying party determines that external organization path validation has failed or is successful, wherein external organization path validation fails when the relying party node determines that the current value of the EOPL counter is greater than the current EOPLC value stored in memory, and wherein external organization path validation is successful when the relying party node determines that the current certificate being evaluated is the last remaining certificate in the chain of certificates.

10. A method according to claim 8, wherein each of the certificates is a public key certificate issued by a certification authority and further comprises:

an issuer field that identifies a name of the certification authority that issued the digital public key certificate; and a subject field that identifies a node trusted by the certification authority specified in the issuer field; and a public key of the node specified in the subject field;

a basic constraints field comprising a path length constraint; and a digital signature of the certification authority comprising: a private key of the certification authority that issued the digital public key certificate.

11. A method according to claim 10, wherein the public key certificates comprise:

X.509 compliant public key certificates.

12. A method according to claim 8, wherein the chain of certificates comprises first through Nth certificates that link the subject node to the trust anchor of the relying party node.

13. A method according to claim 12, wherein the first certificate is the certificate that is issued to the subject node and that identifies the subject node as a subject.

14. A method according to claim 8, wherein the trust anchor comprises:

a root certification authority for the organization.

15. A method for issuing a digital public key certificate to a node trusted by a certification authority, the method comprising:

generating, at the certification authority, a digital public key certificate comprising:

an issuer field that identifies a name of the certification authority that issued the digital public key certificate;

a subject field that identifies a node trusted by the certification authority specified in the issuer field;

a public key of the node specified in the subject field;

a basic constraints field comprising:

a path length constraint;

an external organization flag (EOF) that indicates whether the certificate was issued to a node affiliated with an external organization that is external to an organization of the certification authority, wherein both the organization and the external organization comprise at least one node and at least one certification authority; and an external organization path length constraint (EOPLC) that specifies a value equal to a maximum allowable number of certificates within the chain of certificates that are permitted to include an EOF that is enabled;

and a digital signature of the certification authority comprising: a private key of the certification authority that issued the digital public key certificate; and communicating the digital public key certificate from the certification authority to the node.

* * * * *